United States Patent [19]

Fanning et al.

[11] Patent Number: 5,332,939
[45] Date of Patent: Jul. 26, 1994

[54] ELECTRICAL STATOR

[75] Inventors: Alan W. Fanning, San Jose; Eugene E. Olich, Aptos, both of Calif.

[73] Assignee: General Electric Company, San Jose, Calif.

[21] Appl. No.: 4,011

[22] Filed: Jan. 15, 1993

[51] Int. Cl.$^5$ .................. H02K 11/00; H02K 3/46
[52] U.S. Cl. ..................... 310/71; 310/260; 310/201
[58] Field of Search .............. 310/266, 213, 71, 217, 310/218, 215, 216, 201, 42, 260, 179, 180

[56] References Cited

U.S. PATENT DOCUMENTS

| | | | |
|---|---|---|---|
| 3,543,067 | 11/1970 | Tharp | 310/260 |
| 4,255,683 | 3/1981 | Krisch et al. | 310/260 X |
| 4,508,677 | 4/1985 | Craig et al. | 376/174 |
| 4,859,885 | 8/1989 | Kliman et al. | 310/11 |
| 4,882,514 | 11/1989 | Brynsvold et al. | 310/208 |
| 5,063,320 | 11/1991 | Watanabe et al. | 310/260 X |
| 5,093,598 | 3/1992 | Fort | 310/215 |

Primary Examiner—Steven L. Stephan
Attorney, Agent, or Firm—J. S. Beulick

[57] ABSTRACT

An electrical stator of an electromagnetic pump includes first and second spaced apart coils each having input and output terminals for carrying electrical current. An elongate electrical connector extends between the first and second coils and has first and second opposite ends. The connector ends include respective slots receiving therein respective ones of the coil terminals to define respective first and second joints. Each of the joints includes a braze filler fixedly joining the connector ends to the respective coil terminals for carrying electrical current therethrough.

9 Claims, 3 Drawing Sheets

ELECTRICAL STATOR

The U.S. Government has rights in this invention in accordance with Contract No. DE-AC03-89SF17445 awarded by the Department of the Energy.

The present invention relates generally to an electromagnetic pump of a liquid metal nuclear reactor, and, more specifically, to an electrical stator therein having an improved connection between coils thereof.

BACKGROUND OF THE INVENTION

Advanced nuclear reactors being developed include liquid metal nuclear reactors which use liquid sodium, for example, for cooling the reactor core thereof. In order to circulate the liquid sodium through the reactor core, electromagnetic pumps are used which magnetically pump the liquid sodium therethrough.

More specifically, annular linear induction, or electromagnetic, pumps (ALIP) are known which include annular electrical coils and lamination rings which are stacked together on a common longitudinal centerline axis and have an annular duct extending therethrough. Electrical current provided to the coils induces magnetic flux for pumping the liquid metal through the duct. The coils may be arranged in a single tubular configuration conventionally known as a single stator electromagnetic pump, or two groups of coils may be used, with the first group being configured in one tubular configuration as a radially inner stator, and the second group configured in another tubular configuration as a radially outer stator spaced radially outwardly from the inner stator to define a concentric annular flow duct therebetween in which the liquid sodium is propelled linearly through the electromagnetic pump along its longitudinal centerline axis.

Each of the stators includes a considerable number of discrete coils, with each coil having one or more input and output terminals which must be suitably joined to adjacent coils for carrying the electrical current therethrough. In the double stator electromagnetic pump configuration, the coil terminals of the outer stator extend radially outwardly therefrom, and the coil terminals of the inner stator extend radially inwardly therefrom. Coil terminals of axially spaced apart coils in the inner and outer stators are typically electrically joined together by a longitudinally extending connector in the form of a metal bar. The connector typically extends between every fifth or seventh coil in a stator, for example, for electrically joining together the respective coils. The distal ends of the connector may be suitably joined to the coil terminals by either being welded thereto or riveted thereto in conventional practice.

In an exemplary welded joint between a connector end and a corresponding coil terminal, the end and the terminal may be simply butted end-to-side, respectively, and welded on opposite sides of the joint. Conventional welding results in a relatively small area of fusion between the connector end and the terminal which may increase the electrical resistivity at the joint and provide limited structural strength thereof. In an alternate joint, the connector end and the terminal may be conventionally riveted together in a lap joint. However, such a riveted joint also provides limited structural strength and relatively high electrical resistivity between the riveted members.

Furthermore, although the area surrounding the outer coil in a double stator electromagnetic pump typically provides suitable access to the coil terminals and the connector ends for joining them together during the assembly process, a substantially limited amount of space is available in the annulus region radially inwardly of an inner stator of a double stator electromagnetic pump for joining together the connector and the coil terminals. A welded joint requires access from both sides of the connector to make the joint, and riveting also requires suitable access.

Accordingly, an improved stator for an electromagnetic pump is desired in which the joints between the connectors and the coil terminals may be more readily made during the assembly process, and may have reduced electrical resistivity when compared to welded and riveted joints, while also having improved structural strength for obtaining an improved useful lifetime in an environment subject to elevated temperatures and vibrations found in an electromagnetic pump. Furthermore, an improved connector-to-coil-terminal joint is also desirable for an inner stator of a double stator electromagnetic pump having reduced room in which the joints may be made during the assembly process.

SUMMARY OF THE INVENTION

An electrical stator of an electromagnetic pump includes first and second spaced apart coils each having input and output terminals for carrying electrical current. An elongate electrical connector extends between the first and second coils and has first and second opposite ends. The connector ends include respective slots receiving therein respective ones of the coil terminals to define respective first and second joints. Each of the joints includes a braze filler fixedly joining the connector ends to the respective coil terminals for carrying electrical current therethrough.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
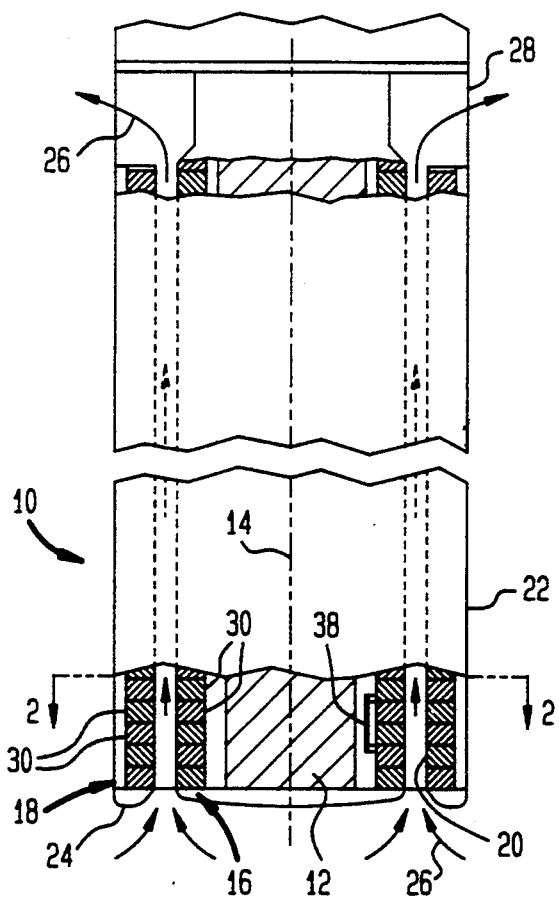
FIG. 1 is a longitudinal, partly sectional view of an exemplary double stator electromagnetic pump having an improved stator in accordance with one embodiment of the present invention.

Illustrated schematically in FIG. 1 is an exemplary double stator, annular linear induction, or electromagnetic, pump (ALIP) 10 configured for use in a liquid metal nuclear reactor (not shown). The pump 10 includes a central structural annular core 12 disposed coaxially about an axial, or longitudinal centerline axis 14. An annular, radially inner electrical stator 16 surrounds the core 12 and is disposed coaxially therewith, and an annular, radially outer electrical stator 18 is spaced radially outwardly from the inner stator 16 and disposed coaxially therewith for positioning an annular flow duct 20 therebetween. A cylindrical housing 22 surrounds the outer stator 18, and an inlet 24 of the flow duct 20 is disposed at the bottom of the housing 22 for receiving a liquid metal such as liquid sodium 26 for flow upwardly through the flow duct 20. The housing 22 has an outlet 28 at an opposite end thereof for discharging the liquid metal 26 after flow through the flow duct 20. In operation, electrical current is suitably provided to both the inner and outer stators 16 and 18 for generating a magnetic flux to propel the liquid metal 26 upwardly or linearly through the flow duct 20 from the inlet 24 and out the outlet 28 in a conventional manner.

The inner and outer stators 16, 18 illustrated in FIG. 1 are substantially identical in configuration except as required for positioning the inner stator 16 radially inwardly of the outer stator 18. For example, each of the stators 16, 18 includes a plurality of axially or vertically stacked annular electrical coils 30 disposed coaxially about the longitudinal centerline axis 14, also referred to herein as the stator longitudinal centerline axis.

Figure 2:
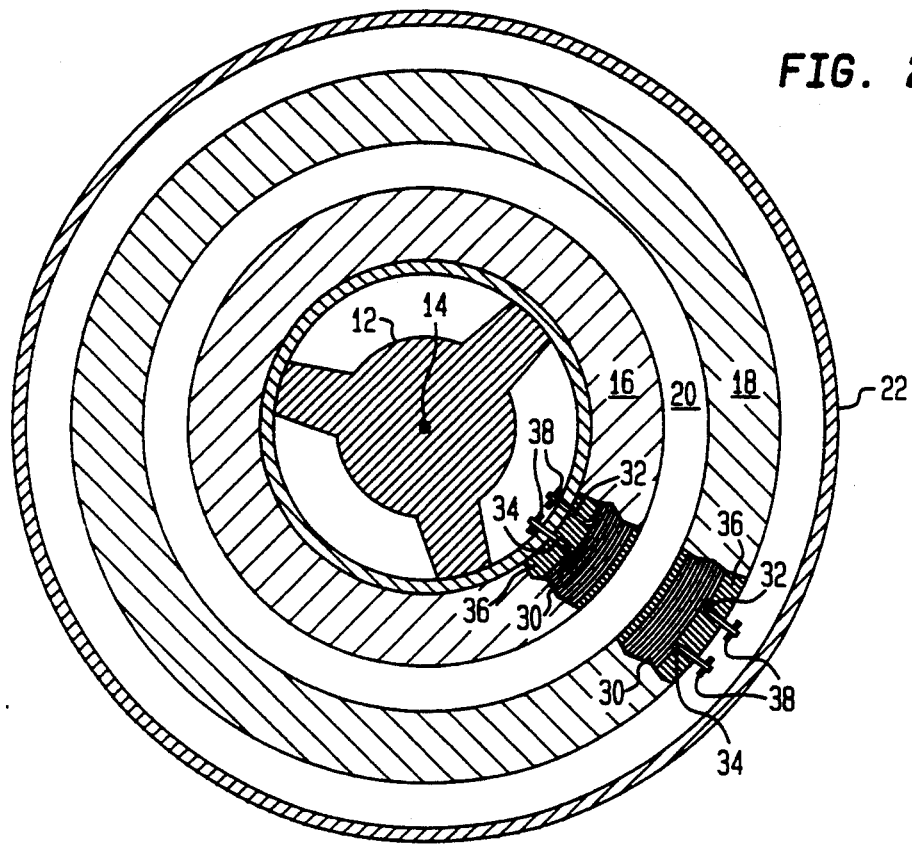
FIG. 2 is a transverse sectional view of the pump illustrated in FIG. 1 taken along line 2—2.

As shown with more particularity in FIG. 2, each of the coils 30 is an electrical conductor wound in a suitable plurality of annular turns relative to the stator centerline axis 14, with each coil 30 including one or more radially extending first, or input terminals 32 and one or more radially extending second, or output terminals 34 for carrying electrical current to and from the respective coils 30. In the outer stator 18, the terminals 32, 34 extend radially outwardly toward the housing 22, and in the inner stator 16, the corresponding terminals 32, 34 extend radially inwardly toward the core 12 and longitudinal centerline axis 14. Each of the stators 16, 18 also includes a plurality of circumferentially abutting stator laminations 36 having a conventional configuration and being disposed between adjacent axially spaced coils 30 in a conventional manner.

Figure 3:
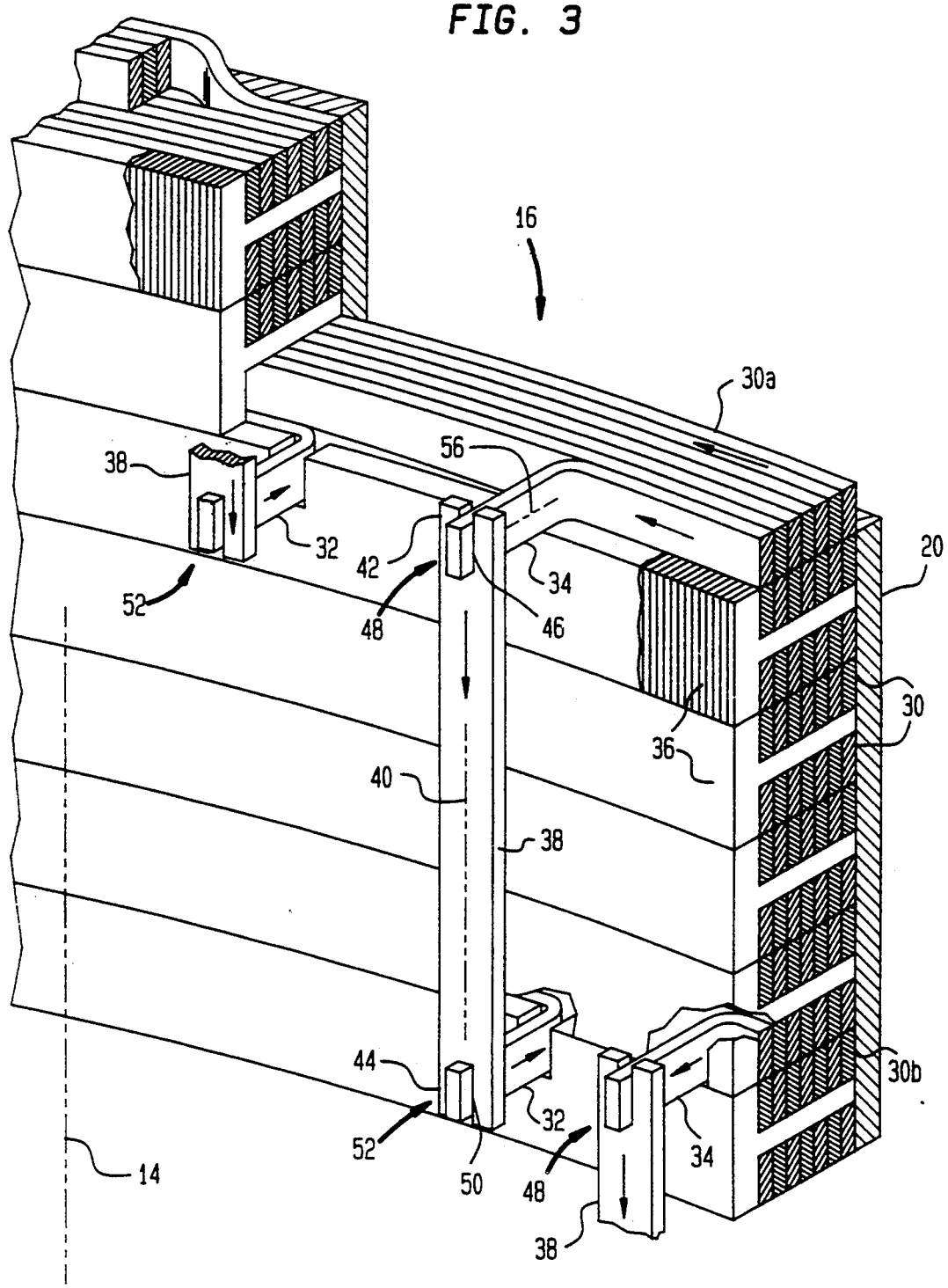
FIG. 3 is a perspective view of a portion of an inner stator of the pump shown in FIGS. 1 and 2 illustrating stacked coils and exemplary terminals extending therefrom joined to respective connectors in accordance with one embodiment of the present invention.

Since the inner and outer stators 16 and 18 are substantially identical in configuration, the inner stator 16 will be described in detail with it being understood that the outer stator 18 may be similarly constructed. FIG. 3 illustrates the construction of the inner stator 16 including the axially spaced coils 30, for example portions of eight being shown, and the corresponding stator laminations 36 therebetween. Each of the coils 30 is one or more continuous electrical conductors wound in two axially adjacent ring portions disposed coaxially about the longitudinal centerline axis 14 and having respective ones of the input and output terminals 32, 34. In the exemplary embodiment illustrated in FIG. 3, a first coil, 30a is electrically connected to a second coil, 30b, which is axially spaced from the first coil 30a by three intervening coils 30. It is conventional to electrically join such spaced coils 30, for example at every fifth coil as shown in FIG. 3, or every seventh coil or other multiple as desired. The intervening coils 30 are similarly interconnected with respective spaced coils again in accordance with conventional practice for providing a plurality of independent electrical circuits through respective groups of the coils 30 for providing effective magnetic flux for propelling the liquid metal 26 through the pump 10 as shown in FIG. 1.

As illustrated in FIG. 3, an elongate electrical connector 38 in the exemplary form of a metal bar electrically joins together respective ones of the coils 30 such as the first coil 30a to the second coil 30b. The connector 38 has a longitudinal axis 40 and is preferably disposed parallel to the stator longitudinal axis 14 and extends axially between the first and second coils 30a, 30b in the exemplary vertical direction illustrated in FIG. 3. The connector 38 includes first and second opposite distal ends 42, 44 which are joined to respective ones of the coil input and output terminals 32, 34 in accordance with the present invention.

More specifically, the first connector end 42 has a first slot 46 which receives therein the output terminal 34 of the first coil 30a to define therewith a first joint 48. The second connector end 44 identically has a second slot 50 which receives therein the input terminal 32 of the second coil 30b, for example, to define therewith a second joint 52. Each of the first and second joints 48 and 52 are identical and the first joint 48 will be described herein in detail with it being understood that the second joint 52 is identically configured in this exemplary embodiment, except that the first joint 48 is at an elevated position relative to the second joint 52 and faces oppositely therefrom.

Figure 4:
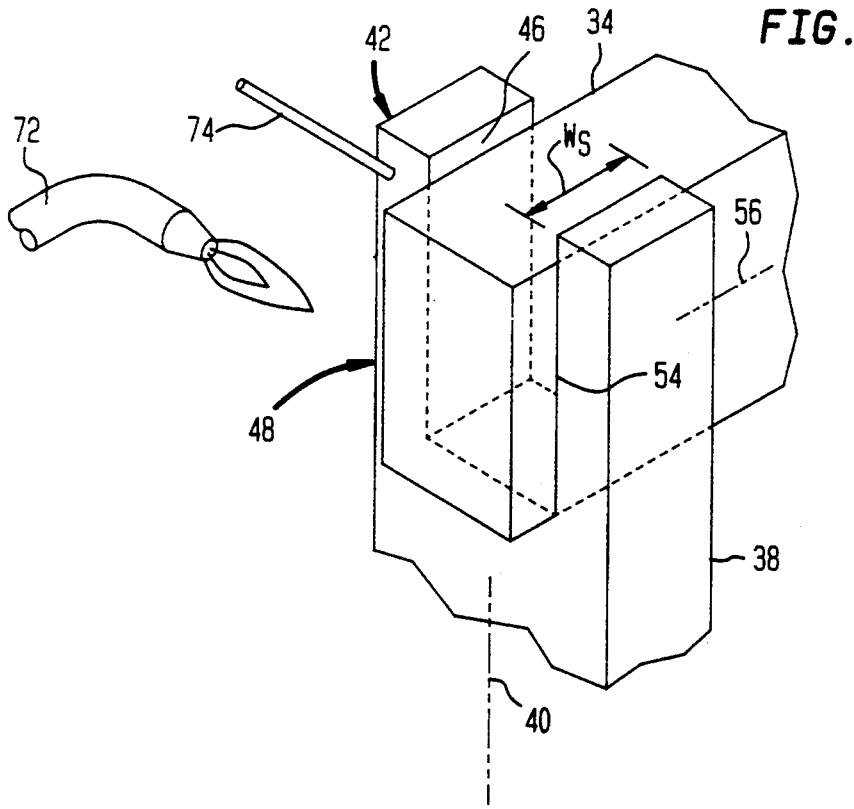
FIG. 4 is a perspective view of an exemplary connector end and coil terminal of the inner stator illustrated in FIG. 3 which are joined together using a braze filler for forming a joint therebetween.

As shown in FIG. 4, each of the first and second joints 48, 52, as represented by the first joint 48, includes a conventional braze material or filler 54 which fixedly joins the first and second connector ends 42, 44 to the respective first coil output terminal 34 and the second coil input terminal 32, which filler 54 is effective for carrying electrical current through the first and second joints 48, 52. The first and second joints 48, 52 use the first and second slots 48, 50 to provide a joint which is an improvement over the welded or riveted butt or lap joints found in conventional connections. The first and second joints 48, 52 not only allow for improved assembly of the connector 38 in the limited space available, but also provide a self-fixturing assembly and increase the surface area of contact between the connector 38 and the terminals 32, 34 for providing a structurally stronger joint having decreased electrical resistivity therebetween for improved conductivity of electrical current therethrough.

Figure 5:
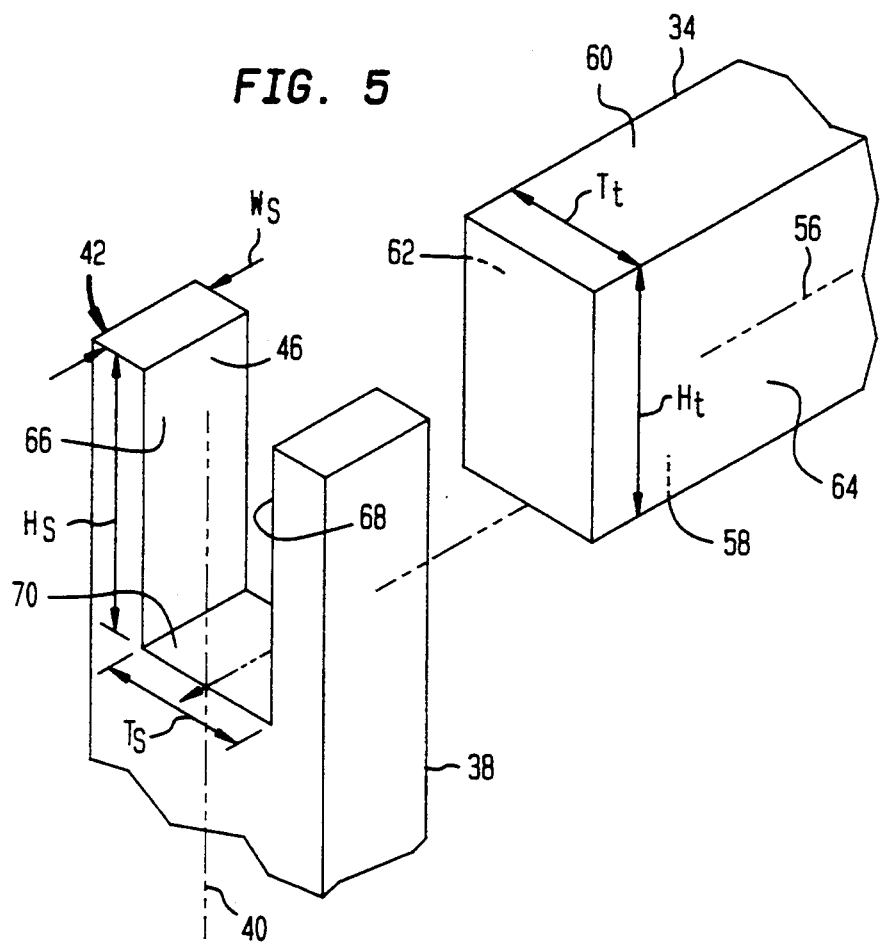
FIG. 5 is an exploded perspective view of the connector end and the coil terminal illustrated in FIG. 4.

More specifically, and referring again to FIG. 3, the input and output terminals 32, 34 preferably extend radially relative to the stator longitudinal axis 14 with each having a respective longitudinal axis 56 extending generally radially. For the inner stator 16 illustrated in FIG. 3, the terminals 32, 34 extend radially inwardly, as additionally shown in FIG. 2, and the corresponding terminals 32, 34 of the outer stator 18 extend radially outwardly also as shown in FIG. 2. As shown in FIG. 5, for example, each of the terminals 32, 34 is preferably rectangular in transverse section relative to the terminal longitudinal axis 56, with each terminal 32, 34 including four surfaces which define the rectangle including a bottom 58, top 60, and first and second opposite sides 62 and 64. Each of the connector ends 42, 44 includes first and second legs 66, 68 which are laterally spaced from each other relative to the connector longitudinal axis 40 and are joined at proximal ends thereof to a common slot base 70, with their distal ends being open to define the respective first and second slots 46, 50 which are generally U-shaped and complementary in configuration with the rectangular input and output terminals 32, 34 of the respective first and second coils 30a, 30b.

As shown in FIG. 3, the several coils 30 are stacked vertically on top of each other to form the inner stator 16, and similarly to form the outer stator 18. There may be about one hundred coils 30 stacked in each of the stators 16, 18 during the assembly process for an exemplary pump 10. The core 12 illustrated in FIG. 2, but not illustrated in FIG. 3 for clarity, is disposed radially inwardly of the inner stator 16 and severely limits the room available for assembling the many connectors 38 to their respective terminals 32, 34. However, the connector 38 including the first and second slots 46, 50 improves the assembly process as well as the resulting first and second joints 48, 52. As shown in FIGS. 3 and 5, the connector legs 66, 68 are preferably disposed parallel to the connector longitudinal axis 40, as well as the stator longitudinal axis 14, so that the first and second slots 46 and 50 extend vertically upwardly and downwardly, respectively. In this way, as the respective coils 30 are stacked one on top of another during the assembly process, each of the connectors 38 may be positioned with its second end 44 hooked over a respective input terminal 32, of the second coil 30b for example, and brazed as further described hereinbelow. Additional coils 30 as desired are then stacked in turn over the second coil 30b with their respective terminals 32, 34 (not shown in FIG. 3) also being suitably joined and brazed to respective connectors 38 in a similar fashion. When the first coil 30a is stacked upon the preceding coil 30 as shown in FIG. 3, its output terminal 34 may then be positioned into the first slot 46 of the connector first end 42 which provides self-fixturing thereof.

As shown in more particularity in FIG. 4, the connector first end 42 and the output terminal 34 are conventionally heated by a torch 72, and a conventional brazing rod 74 is used to melt the braze filler 54 therefrom at the juncture between the output terminal 34 and the connector first end 42. Conventionally known capillary action causes the braze filler 54 to flow along the entire three joining surfaces between the terminal 34 and the connector 38 for forming a mechanically strong joint having a relatively large surface area for providing a commensurate electric current path between the connector 38 and the terminal 34 once the filler cools. The braze filler 54 bonds together the slot base 70 with the terminal bottom 58 as one side (see FIG. 5 for reference numerals); the connector first leg 66 with the terminal first side 62 as a second side; and the connector second leg 68 with the terminal second side 64 as a third side in each of the respective first and second joints 48, 52. The terminal top 60 remains unbonded for creating a three-sided joint.

Referring again to FIG. 5, each of the terminals 32, 34 has a height $H_t$ extending between the opposite bottom and top surfaces 58, 60 thereof; and a thickness $T_t$ extending between the opposite first and second sides 62, 64 thereof; and the terminal height $H_t$ is preferably greater than the terminal thickness $T_t$ for creating a vertically extending rectangular transverse configuration.

Similarly, each of the first and second slots 46, 50 has a thickness $T_s$ extending between the first and second legs 66, 68 thereof; a height $H_s$ extending from the slot base 70 to the distal ends of the legs 66, 68; and a width $W_s$ in a direction perpendicular to both the slot thickness $T_s$ and the slot height $H_s$. The terminal height $H_t$ is preferably substantially equal to, or slightly smaller than, the slot height $H_s$; and the terminal thickness $T_t$ is substantially equal to the slot thickness $T_s$ for forming a full height and thickness brazed joint around each of the terminals 32, 34 on three sides thereof for maximizing the fusion area thereof with the connector ends 42, 44. The respective thicknesses $T_s$ and $T_t$ of the respective slots 46, 50 and the terminals 32, 34 are conventionally selected for creating a relatively tight joint therebetween for improving the self-fixturing thereof. Even a loose fitting between the respective terminals 32, 34 and the slots 46, 50 provides a degree of self-fixturing, but the tighter the fit therebetween the more rigidly will be held the connector 38 to the respective terminals 32, 34 during the assembly and brazing processes. The terminal thickness $T_t$ is preferably equal to the slot thickness $T_s$ within the bounds of a conventional manufacturing tolerance therebetween to ensure a relatively tight fit. Alternatively, the terminal thickness $T_t$ may be made slightly larger than the slot thickness $T_s$ for creating an interference fit using any conventional process including preheating the connector 38 to allow it to expand for receiving the respective thicker terminals 32, 34.

As shown in FIG. 4, the terminals 32, 34 preferably extend fully through the respective first and second slots 46, 50 so that the braze filler 54 bonds the terminals 32, 34 therein over the full extent of the slot width $W_s$ to maximize the contact area between the terminals 32, 34 and the connector ends 42, 44. In this way, a strong mechanical joint is created between the connector 38 and the respective terminals 32, 34 for carrying mechanical forces therethrough, including vibratory forces, which occur during operation. And, the three-sided brazed joints 48, 52 provide a substantial and continuous electrical flowpath through the braze filler 54 for more effectively carrying electrical current between the terminals 32, 34 and the connector 38 during operation.

Referring again to FIG. 2, it will be appreciated that even in the limited space available between the core 12 and the inner stator 16, suitable access is provided from at least one side of the connectors 38 and terminals 32, 34 for assembling together these components and brazing together the respective joints therebetween. Similar connectors 38 may be correspondingly joined to the terminals 32, 34 of the coils 30 of the outer stator 18 as desired for obtaining the improved joints therebetween although assembly space is not a significant factor therein.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. An electrical stator of an electromagnetic pump comprising:
    first and second annular coils disposed coaxially about a stator longitudinal axis and spaced axially relative to each other, each of said coils comprising an electrical conductor wound to form a plurality of turns and bent radially inward at each end to form radially extending input and output terminals for carrying electrical current to and from said coils;

an elongate electrical connector having a connector longitudinal axis disposed parallel to said stator longitudinal axis, and including first and second opposite ends, said first connector end having a first slot receiving therein said first coil output terminal to define therewith a first joint, and said second connector end having a second slot receiving therein said second coil input terminal to define therewith a second joint; and each of said first and second joints including a braze filler fixedly joining said first and second connector ends to said first coil output terminal and said second coil input terminal, respectively, and being effective for carrying electrical current through said first and second joints.

2. A stator according to claim 1 wherein:

said input and output terminals of said first and second coils are rectangular, and each includes a bottom, a top, and first and second opposite sides;

each of said first and second connector ends includes first and second spaced apart legs joined at proximal ends thereof to a base, and being open at distal ends thereof to define said first and second slots, said slots being generally U-shaped and complementary in configuration with said rectangular input and output terminals of said first and second coils; and said braze filler bonds together said base with said bottom, said first leg with said first side, and said second leg with said second side in said respective first and second joints.

3. A stator according to claim 2 wherein:

each of said terminals has a height extending between said bottoms and tops thereof, and a thickness extending between said first and second sides thereof, and said terminal height is greater than said terminal thickness;

each of said slots has a thickness extending between said first and second legs thereof, a height extending from said slot base to said distal ends of said legs, and a width in a direction perpendicular to both said slot thickness and said slot height; and said terminal height is substantially equal to said slot height, and said terminal thickness is substantially equal to said slot thickness.

4. A stator according to claim 3 wherein said connector has a longitudinal axis disposed parallel to said stator longitudinal axis, and said connector legs are disposed parallel to said connector longitudinal axis.

5. A stator according to claim 4 wherein said terminals extend fully through said respective first and second slots so that said braze filler bonds said terminals therein over the full extent of said slot width.

6. A stator according to claim 5 wherein said input and output terminals extend radially outwardly.

7. A stator according to claim 6 in the form of a radially outer stator disposed radially outwardly of a radially inner stator of said electromagnetic pump.

8. A stator according to claim 5 wherein said input and output terminals extend radially inwardly.

9. A stator according to claim 8 in the form of a radially inner stator disposed radially inwardly of a radially outer stator of said electromagnetic pump.

* * * * *